(12) United States Patent
Oliver

(10) Patent No.: US 11,365,162 B1
(45) Date of Patent: Jun. 21, 2022

(54) COMPOST COLLECTION DEVICE

(71) Applicant: Emily J. Oliver, Jonesborough, TN (US)

(72) Inventor: Emily J. Oliver, Jonesborough, TN (US)

( * ) Notice: Subject to any disclaimer, the term of this patent is extended or adjusted under 35 U.S.C. 154(b) by 172 days.

(21) Appl. No.: 17/032,184

(22) Filed: Sep. 25, 2020

Related U.S. Application Data

(60) Provisional application No. 62/906,344, filed on Sep. 26, 2019.

(51) Int. Cl.
| | | |
|---|---|---|
| *C05F 17/907* | (2020.01) | |
| *B65F 1/16* | (2006.01) | |
| *B65F 1/14* | (2006.01) | |

(52) U.S. Cl.
CPC .............. *C05F 17/907* (2020.01); *B65F 1/16* (2013.01); *B65F 2001/1489* (2013.01); *B65F 2001/1676* (2013.01)

(58) Field of Classification Search
CPC ....... A61B 50/36–39; B65F 2001/1676; B65F 2001/1489
See application file for complete search history.

(56) References Cited

U.S. PATENT DOCUMENTS

| | | | |
|---|---|---|---|
| 5,765,339 | A | 6/1998 | Garland |
| 9,592,956 | B2 | 3/2017 | Garland |
| 10,294,169 | B2 | 5/2019 | Smith |
| 2010/0193534 | A1 | 8/2010 | Roberts et al. |

FOREIGN PATENT DOCUMENTS

| | | |
|---|---|---|
| CN | 202400982 U | 8/2012 |
| CN | 103043349 A | 4/2013 |
| CN | 204939325 U | 1/2016 |
| CN | 206872695 U | 1/2018 |
| CN | 109850438 A | 6/2019 |
| CN | 209396365 U | 9/2019 |
| KR | 101167027 B1 | 7/2012 |

*Primary Examiner* — Mollie Impink
(74) *Attorney, Agent, or Firm* — Luedeka Neely Group, PC

(57) ABSTRACT

A compost collection device including: a waste collection bin; and
a removable lid for the bin, the lid including:
  a first seal disposed for circumferentially sealing between the lid and a top rim of the bin;
  a circular opening in the lid;
  a rotatable sphere have a waste material pocket therein, the sphere being disposed in the lid;
  a second seal disposed between the sphere and the opening in the lid, for circumferentially sealing between the sphere and the opening in the lid;
  a handle attached to the sphere for rotating the rotatable sphere to deposit waste materials into the bin;
  a retaining lid having an opening therein for depositing waste materials into the pocket in the sphere; and
  a third seal disposed between the retaining lid and the sphere adjacent the opening in the retaining lid, for sealing between the sphere and the opening in the retaining lid.

20 Claims, 10 Drawing Sheets

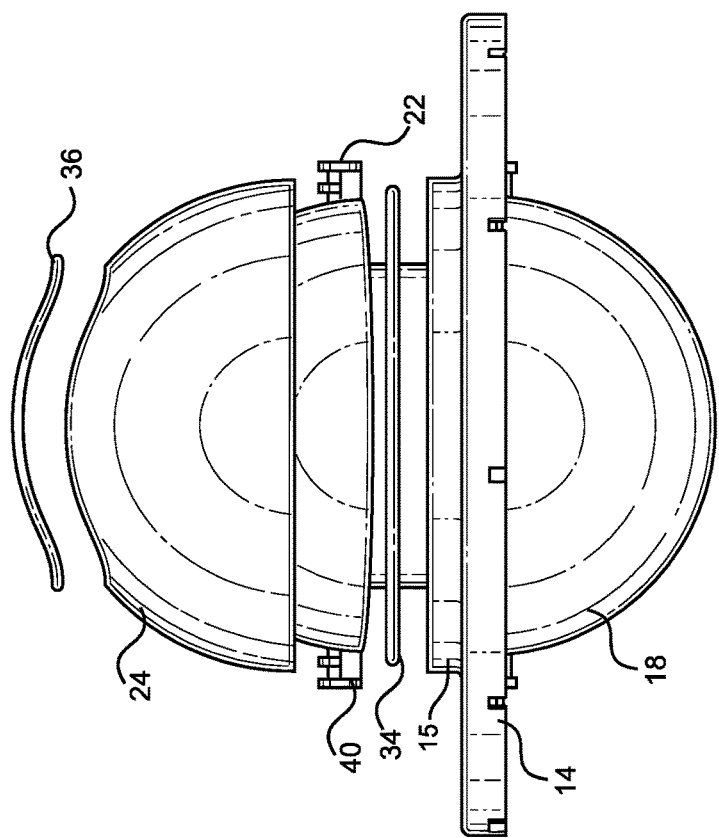
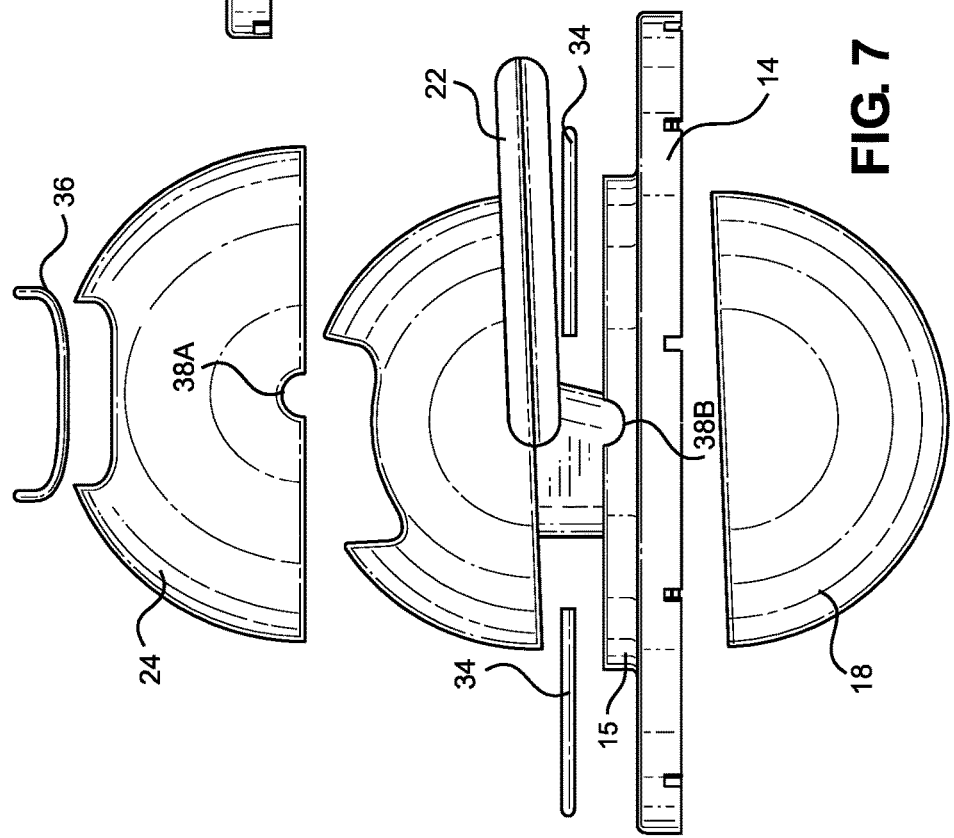
FIG. 7
FIG. 8

COMPOST COLLECTION DEVICE

RELATED APPLICATION

This application claims priority to provisional application Ser. No. 62/906,344, filed Sep. 26, 2019.

TECHNICAL FIELD

The disclosure is directed to an improved compost collection device and in particular to a compost collection bin that reduces or eliminates odors during the compost collection process.

BACKGROUND AND SUMMARY

A problem associated with compost collection devices is that the devices often exude an odor when being filled, particularly if the devices are sitting on a counter in a kitchen where waste materials are being collected during food preparation and clean-up. What is needed therefore is a compost collection device that is suitable for use on a kitchen counter, or inside a house or other building, and that does not exude noxious odors during the compost collection process.

An additional problem associated with compost collection devices is the transfer of compostable foods and materials from the exterior into the interior of the collection container such that the devices often lose or otherwise splatter smaller pieces or bits of materials and foods over the device itself or the counter or floor the device sits on. What is needed therefore is a compost collection device that is suitable for use on a kitchen counter, floor, or inside a house or other building, and that does not lose or smatter foods during the transfer process to the interior compost collection container.

With regard to the forgoing, embodiments of the disclosure provide a compost collection device and a method for collecting waste materials using the compost collection device. According to one aspect of the disclosed subject matter, a compost collection device is provided. The compost collection device includes a waste collection bin and a removable lid for the waste collection bin. The removable lid contains a first seal disposed between the removable lid and a top rim of the waste collection bin for circumferentially sealing between the removable lid and the top rim of the waste collection bin. The removable lid has a circular opening therein and a rotatable sphere disposed in the circular opening in the removable lid. The rotatable sphere has a waste material pocket disposed therein. A second seal is disposed between the rotatable sphere and the circular opening in the removable lid for circumferentially sealing between the rotatable sphere and the circular opening in the removable lid. A handle is attached to the rotatable sphere for rotating the rotatable sphere to deposit waste materials from the waste material pocket into the waste collection bin. A retaining lid is provided and has an opening therein for depositing waste materials into the waste material pocket in the rotatable sphere. A third seal is disposed between the retaining lid and the rotatable sphere adjacent the opening in the retaining lid for circumferentially sealing between the rotatable sphere and the opening in the retaining lid.

In another embodiment, there is provided a method for collecting waste materials for a compost pile. According to another aspect of the disclosed subject matter, the method includes providing a compost collection device. The compost collection device includes a waste collection bin and a removable lid for the waste collection bin. The removable lid contains a first seal disposed between the removable lid and a top rim of the waste collection bin for circumferentially sealing between the removable lid and the top rim of the waste collection bin. The removable lid has a circular opening therein and a rotatable sphere disposed in the circular opening in the removable lid. The rotatable sphere has a waste material pocket disposed therein. A second seal is disposed between the rotatable sphere and the circular opening in the removable lid for circumferentially sealing between the rotatable sphere and the circular opening in the removable lid. A handle is attached to the rotatable sphere for rotating the rotatable sphere to deposit waste materials from the waste material pocket into the waste collection bin. A retaining lid is provided and has an opening therein for depositing waste materials into the waste material pocket in the rotatable sphere. A third seal is disposed between the retaining lid and the rotatable sphere adjacent the opening in the retaining lid for circumferentially sealing between the rotatable sphere and the opening in the retaining lid. During use, waste materials are inserted into the waste material pocket in the rotatable sphere. The rotatable sphere is then rotated from a waste collection position through an angle ranging from about 140 to about 180 degrees to a waste deposit position, whereby substantially all of the waste materials in the waste material pocket of the rotatable sphere fall into the waste collection bin. The rotatable sphere is then rotated back to the waste deposit position to seal the waste collection bin from odor release to the atmosphere.

In some embodiments, the compost collection device further includes a waste collection bag for insertion into the waste collection bin.

In some embodiments, the compost collection device includes a cover for covering the waste collection bin when the removable lid is removed from the waste collection bin.

In some embodiments, the handle of the waste collection device is between the retaining lid and the removable lid.

In some embodiments, the retaining lid is fixedly engaged with the removable lid with the rotatable sphere disposed between the removable lid and the retaining lid.

In some embodiments, the rotatable sphere is rotatable from a waste collection position to a waste deposit position through a rotation angle ranging from about 140 to about 180 degrees.

In some embodiments, the first seal, the second seal, and the third seal are made of resilient O-ring materials.

In some embodiments, waste materials are inserted into the collection bin or into a bag in the collection bin until the collection bin is full.

According to another aspect of the disclosed subject matter, a compost collection device is provided. The compost collection device includes a waste collection bin and a removable lid for the waste collection bin. The removable lid has a circular opening. A vertical lip is positioned around the circular opening, and the vertical lip has at least two vertical lip grooves. A retaining lid having a dome-like spherical shell structure and at least two retaining lid grooves are positioned over the circular opening. Each retaining lid groove corresponds to a vertical lip groove to form a shaft stub tunnel. A rotatable sphere is disposed at least partially in the retaining lid and in the circular opening in the removable lid. The rotatable sphere has a waste material pocket disposed therein. A first seal is disposed between the rotatable sphere and the circular opening in the removable lid for circumferentially sealing between the rotatable sphere and the circular opening in the removable lid. The retaining lid has an opening therein for depositing waste materials into the waste material pocket in the rotatable sphere. A first shaft stub and a second shaft stub are positioned on opposite sides of the rotatable sphere. Each shaft stub is positioned through a shaft stub tunnel. A handle is attached to the rotatable sphere by the first shaft stub and the second shaft stub through a retaining lid groove and a vertical lip groove for rotating the rotatable sphere to deposit waste materials from the waste material pocket into the waste collection bin. A second seal is disposed between the retaining lid and the rotatable sphere adjacent the opening in the retaining lid, the second seal for circumferentially sealing between the rotatable sphere and the opening in the retaining lid.

An advantage of the embodiments of the disclosure, is that the compost collection device described herein is relatively simple to manufacture, yet provides positive sealing of odors from waste materials contained therein.

BRIEF DESCRIPTION OF THE DRAWINGS

In accordance with embodiments of the disclosure there is provided the following drawings which illustrate various non-limiting aspects of the disclosed embodiments, wherein

FIGS. 7 and 8 are exploded views, not to scale, of the removable lid assembly of the compost collection device of FIG. 1.

DETAILED DESCRIPTION OF EXEMPLARY EMBODIMENTS

Figure 1:
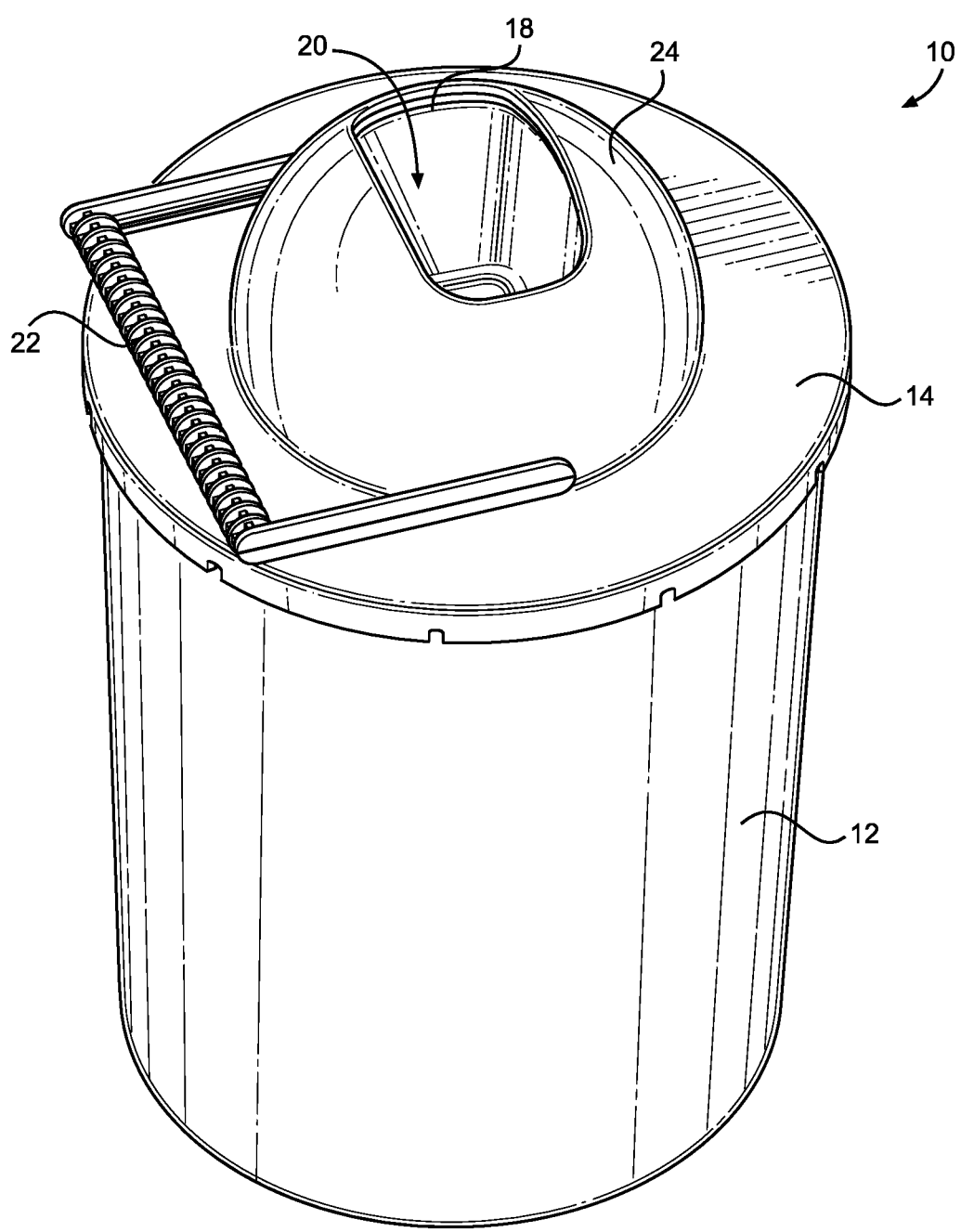
FIG. 1 is a perspective view, not to scale, of a compost collection device according to an embodiment of the disclosure.
Figure 2:
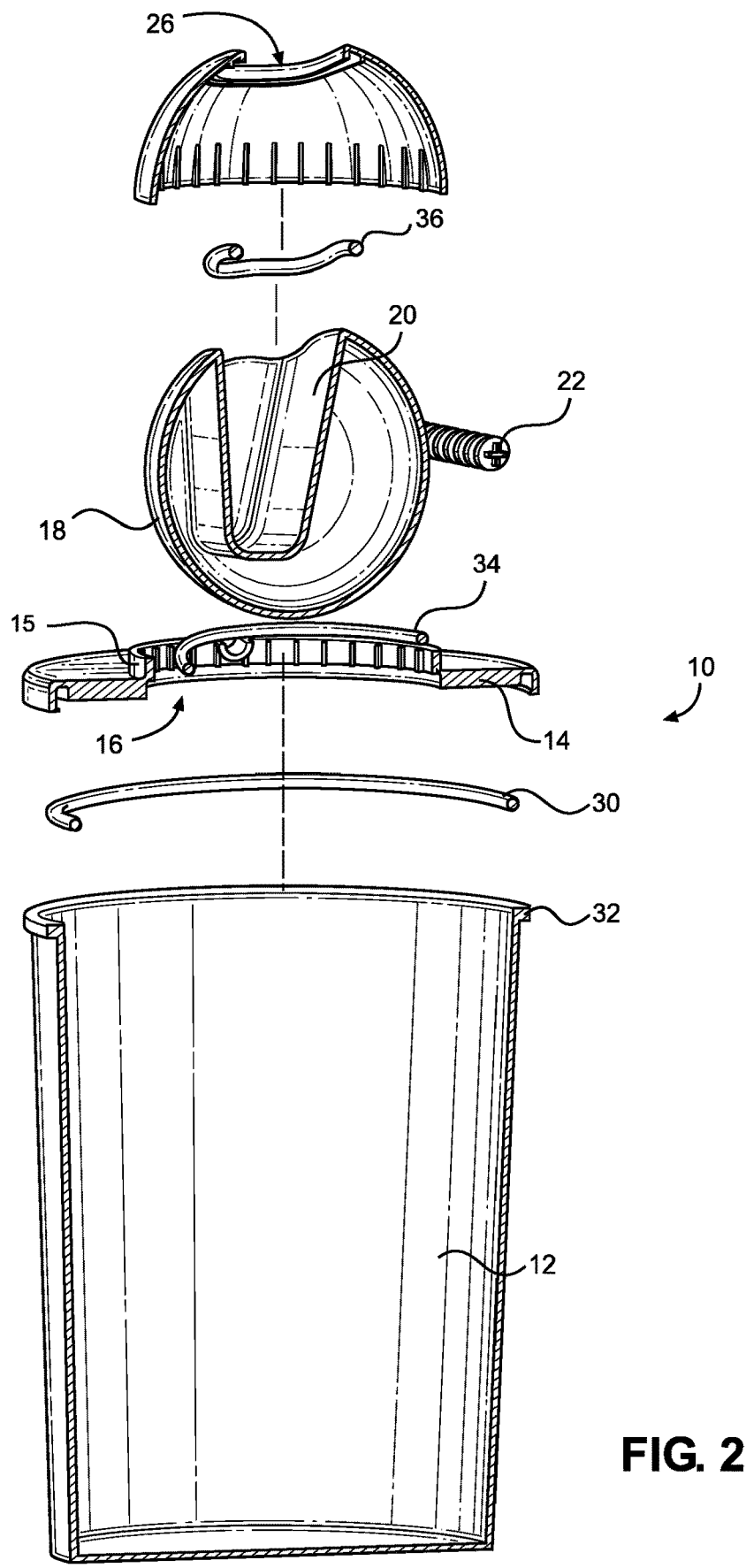
FIG. 2 is an exploded perspective view, not to scale, of components of the composite collection device of FIG. 1.
Figure 5:
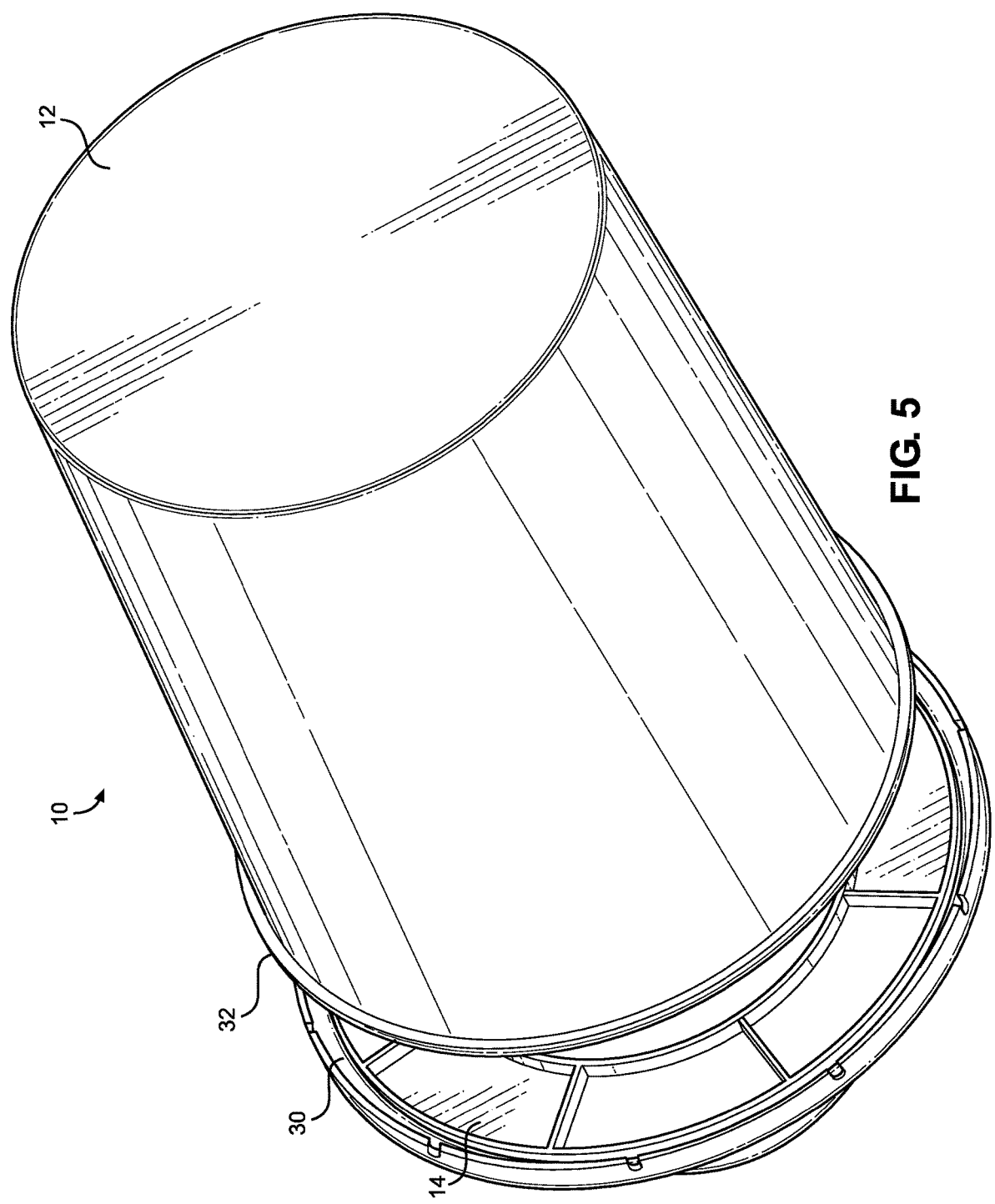
FIG. 5 is a bottom perspective view, not to scale, of portions of the compost collection device of FIG. 1.
Figure 6:
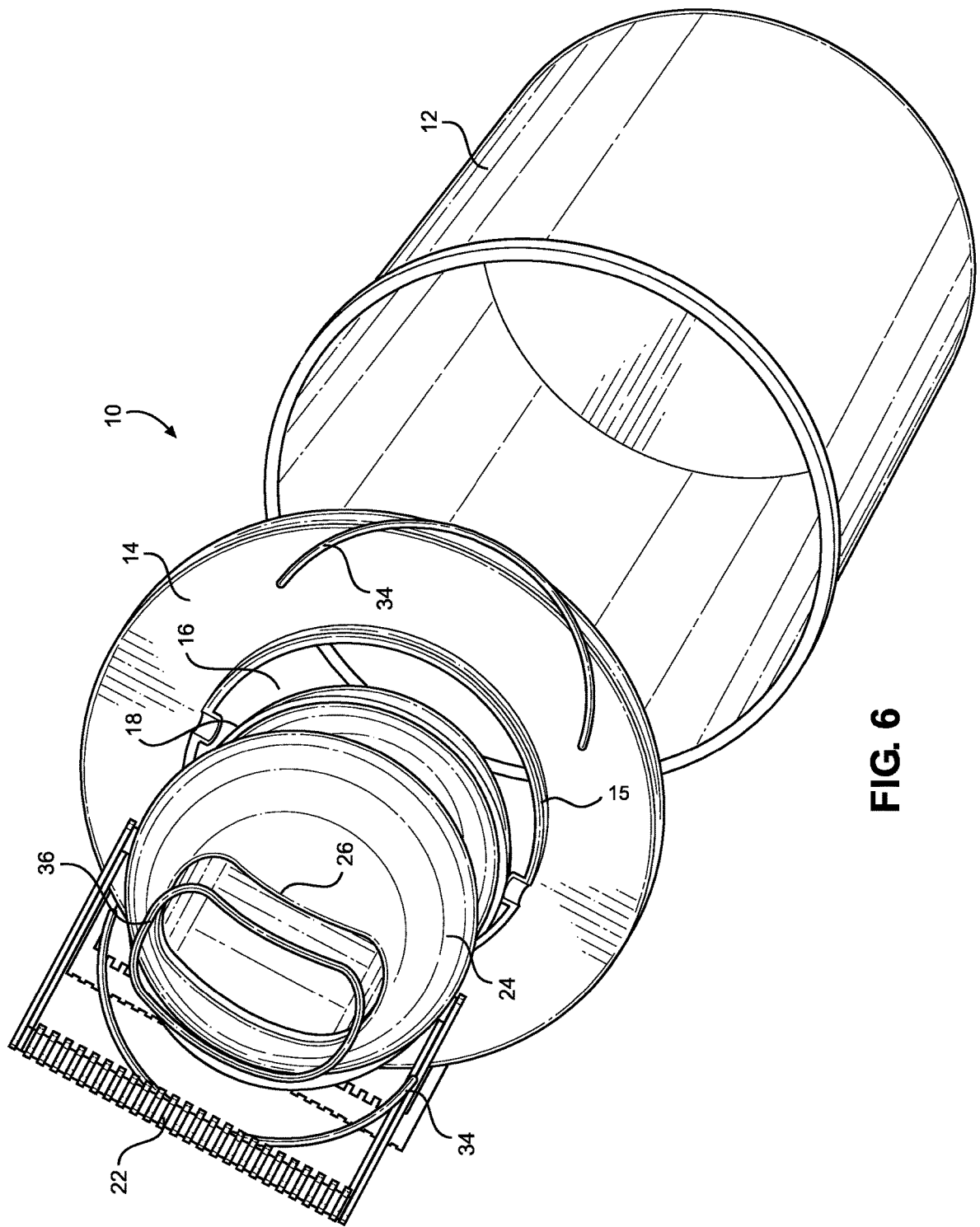
FIG. 6 is a top perspective exploded view, not to scale, of portions of the compost collection device of FIG. 1.

With reference to FIGS. 1-6, there is shown a compost collection device 10, that includes a waste collection bin 12 and a removable lid 14 for the waste collection bin 12. The removable lid 14 has a circular opening 16 therein (FIG. 6). A rotatable sphere 18 is disposed in the circular opening 16 in the removable lid 14. The rotatable sphere 18 has a waste material pocket 20 disposed therein (i.e., the waste material pocket is positioned within the rotatable sphere). A handle 22 is attached to the rotatable sphere 18 for rotating the rotatable sphere 18 to deposit waste materials from the waste material pocket 20 into the waste collection bin 12. A retaining lid 24 is fixedly attached to the removable lid 14 and has an opening 26 (FIG. 2) therein for depositing waste materials into the waste material pocket 20 in the rotatable sphere 18. Removable lid 14 has a vertical lip 15 around circular opening 16 (FIG. 2). As shown, the rotatable sphere 18 is substantially hollow. However, a solid rotatable sphere 18 having a waste material pocket 20 therein may also be used.

Retaining lid 24 has a dome-like spherical shell structure for at least partially housing rotatable sphere 18, and retaining lid 24 is positioned over circular opening 16 (FIG. 6) of removable lid 14. Retaining lid 24 is positioned over circular opening 16 (FIG. 6) of removable lid 14 such that waste deposited in waste material pocket 20 of rotatable sphere 18 may be transferred to waste collection bin 12 by rotating rotatable sphere 18. Two shaft stubs positioned on opposite sides of the rotatable sphere (i.e., the two shaft stubs are diametrically opposed) are connected to a handle, for example shaft stubs 40 (FIGS. 8, 10A-10C), and pass through the retaining lid and removable lid to the rotatable sphere housed within such that the rotatable sphere may be rotated by a handle. As shown, handle 22 provides for a sturdy and readily controllable pull/push motion to rotate rotatable sphere 18.

Figure 3:
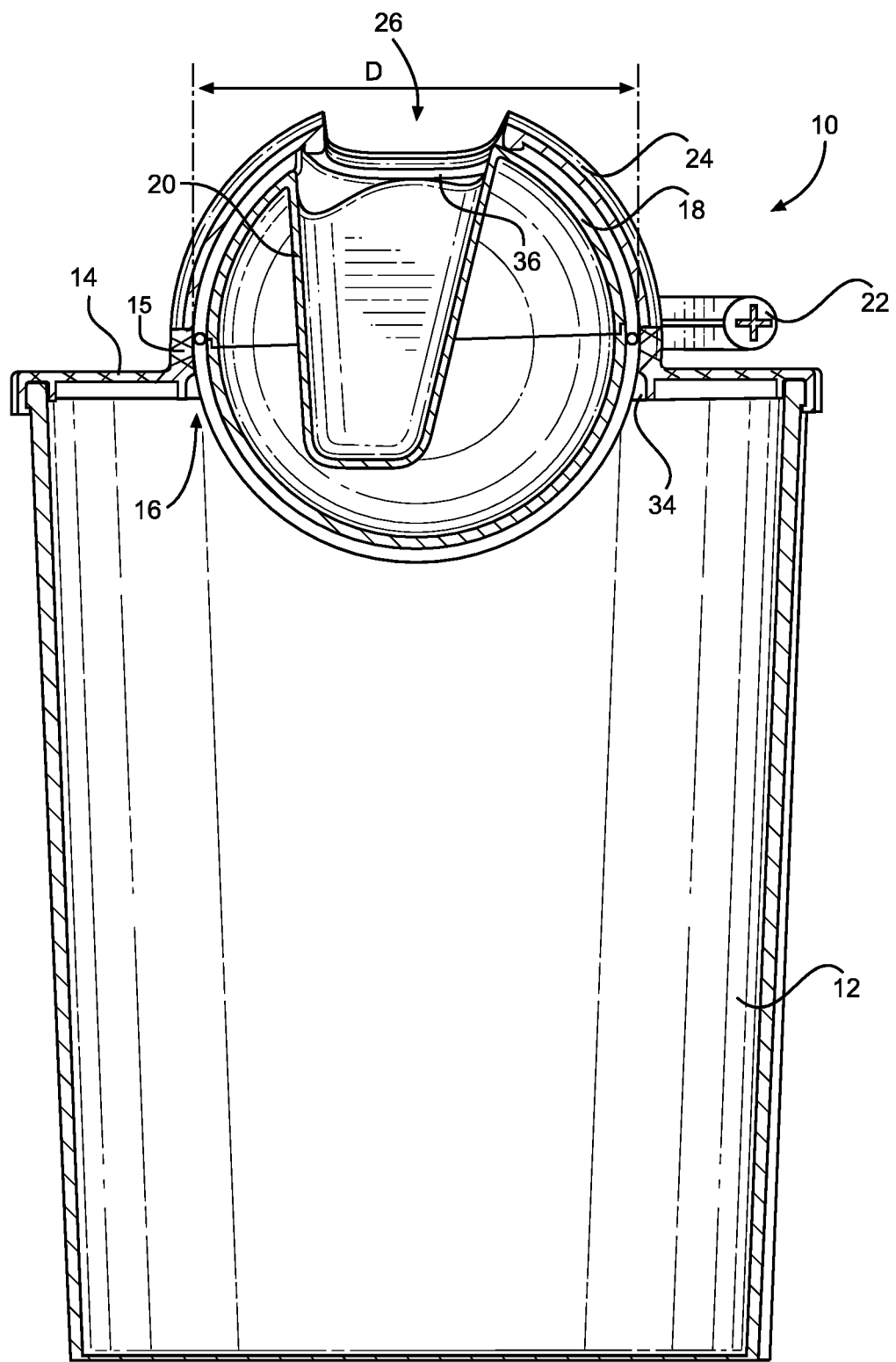
FIG. 3 is a side cross-sectional view, not to scale, of the components of the compost collection device of FIG. 1.
Figure 4:
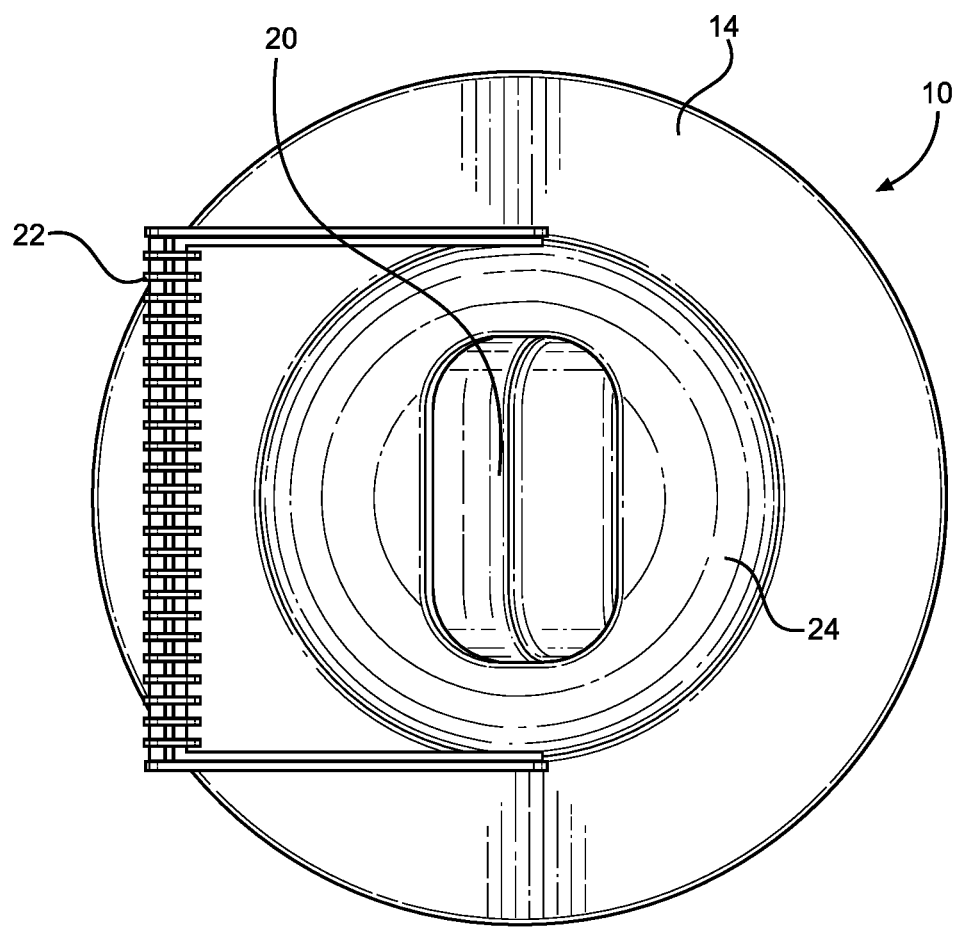
FIG. 4 is a top plan view, not to scale, of the compost collection device of FIG. 1.

With reference to FIGS. 2-3 and 5, the compost collection device 10 further includes at least three seals for reducing the escape of odors from the waste collection bin 12. A first seal 30 is provided between the removable lid 14 and a top rim 32 of the waste collection bin 12. The first seal 30 may be made of a resilient sealing material such as natural or synthetic rubber and may be an o-ring type seal or a gasket type seal.

A second seal 34 is disposed between the rotatable sphere 18 and the circular opening 16 in the removable lid 14. The second seal 34 may also be made of a resilient sealing material such as natural or synthetic rubber, or any other sealing material such as a sealing felt, foamed plastic, carbon fibrous material, rope-like material, and the like to provide a positive seal between the sphere 18 and the collection bin 12 so that noxious odors do not escape from the collection bin 12. In one embodiment, the second seal 34 is an o-ring seal that enables the rotatable sphere 18 to freely rotate from a first position for loading the pocket 20 in the sphere with waste materials, and a second position for dumping the waste materials into the waste collection bin 12.

A third seal 36 is provided between the rotatable sphere 18 and the retaining lid 24. The third seal 36 is disposed in the retaining lid adjacent the opening 26 in the retaining lid 24. Like the second seal 34, the third seal 36 may be made of a resilient sealing material such as natural or synthetic rubber, or any other sealing material such as a sealing felt, foamed plastic, carbon fibrous material, rope-like material, and the like to provide a positive seal between the sphere 18 and the collection bin 12 so that noxious odors do not escape from the collection bin 12. In one embodiment, the third seal 36 is an o-ring seal that enables the rotatable sphere 18 to freely rotate from the first position for loading the pocket 20 with waste materials, to the second position for dumping the waste materials into the waste collection bin 12. Accordingly, there may be many variations of the first, second and third seals that may be used by one skilled in the art to prevent noxious odors from escaping from the collection bin 12.

As shown in FIG. 3, when the retaining lid 24 is attached to the removable lid 14, the sphere 18 is retained in the opening 16 in the removable lid 14. Accordingly, the opening 16 in the removable lid 14 is slightly smaller than a diameter D of the rotatable sphere 18. Retaining lid 24 and removable lid 14 may be securely attached to one another via a snap in place connection for easy separation of the retaining lid 24 from removable lid 14 for cleaning.

As seen in FIGS. 7 and 8, the retaining lid 24 and the removable lid 14 each contain at least two grooves, retaining lid grooves 38a and vertical lip grooves 38b respectively, for rotation of the shaft stubs 40 on each side of the rotatable sphere connecting the rotatable sphere 18 to the handle 22.

Vertical lip grooves 38*b* are positioned in vertical lip 15 of removable lid 14. Each retaining lid groove 38*a* corresponds to a vertical lip groove 38*b* to form a shaft stub tunnel. Thus, shaft stubs 40 pass through the shaft stub tunnels through retaining lid 24 and removable lid 14 formed by grooves 38*a* and 38*b* when positioned together. The user friendly grabbable portion of handle 22 is connected to each shaft stub 40 by handle extensions such that the user friendly grabbable portion is positioned external of the retaining lid and parallel to an axis between the shaft stubs. In operation, the user friendly grabbable portion of handle 22 orbitally rotates around an axis between the shaft stubs 40.

Figure 9:
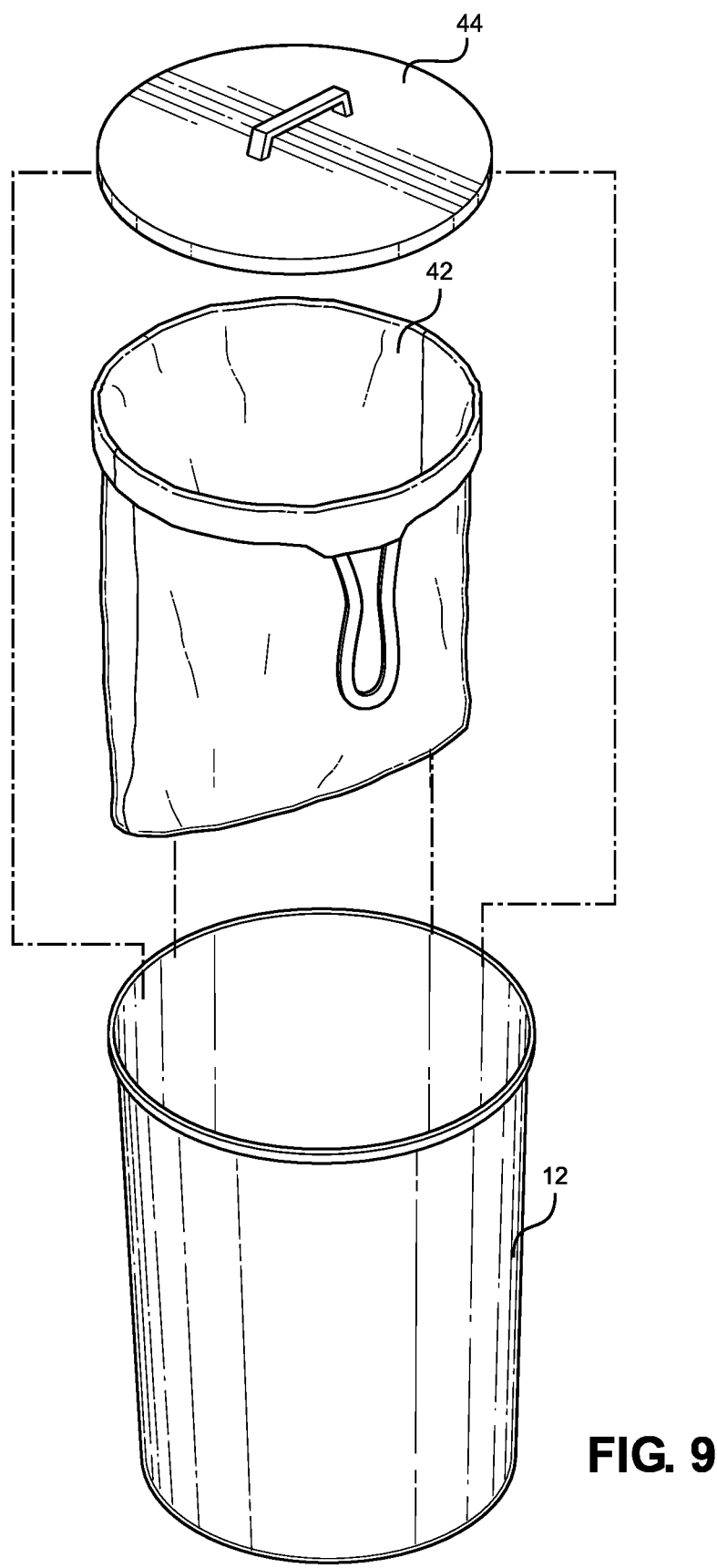
FIG. 9 is a perspective view, not to scale, of an alternative embodiment of the compost collection device of FIG. 1.

An alternative embodiment of the disclosure is illustrated in FIG. 9. According to FIG. 9, a removable bag 42 may be inserted into the waste collection bin 12 prior to the removable lid 14 being attached to the waste collection bin 12. In another embodiment, the removable lid 14 may be replaced by a removable cover 44 to cover the waste collection bin 12 when the bin 12 is full.

Figure 10A:
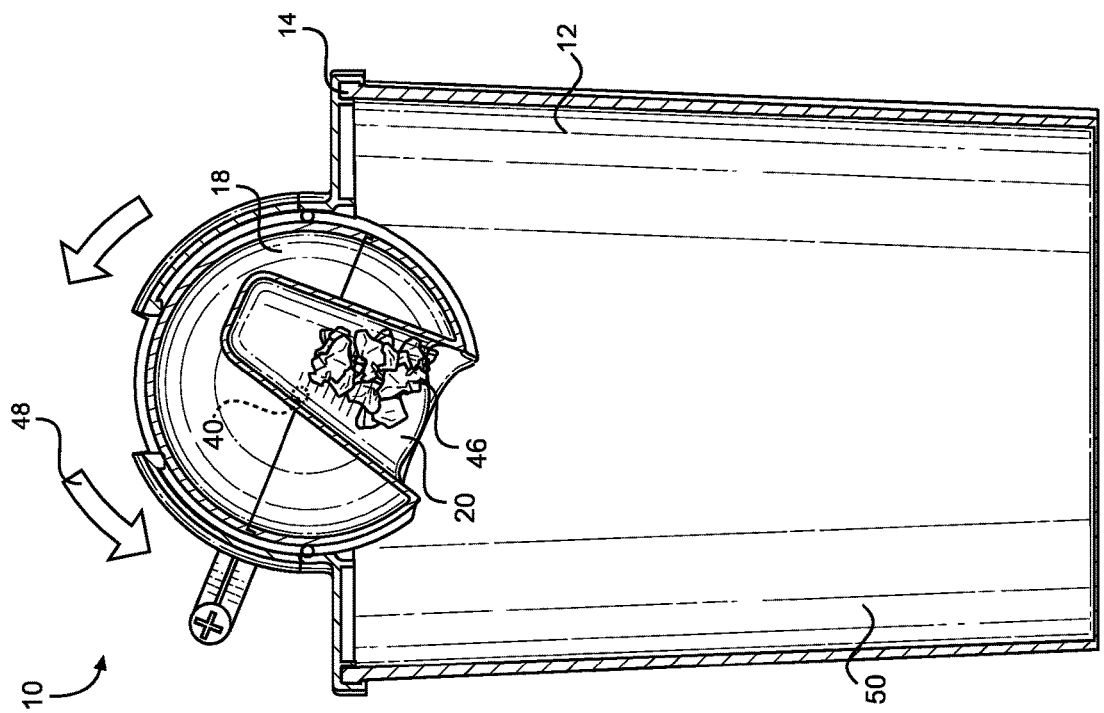
FIGS. 10A-10C are schematic illustrations of the use of the compost collection device of FIG. 1.
Figure 10B:
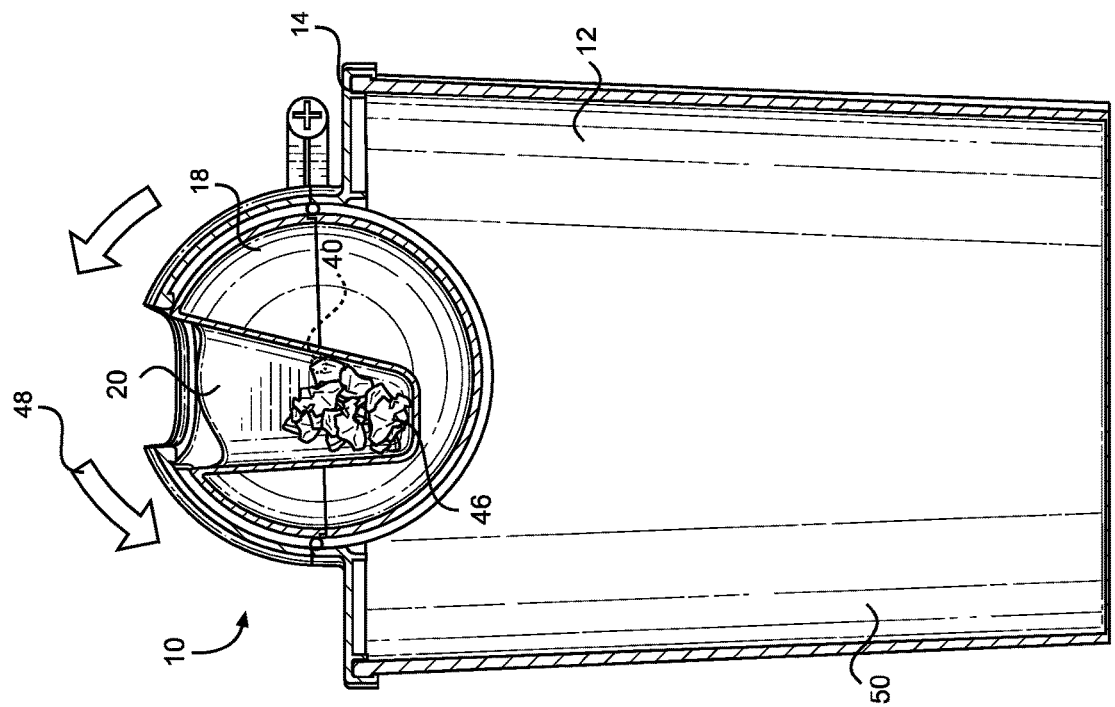
Figure 10C:
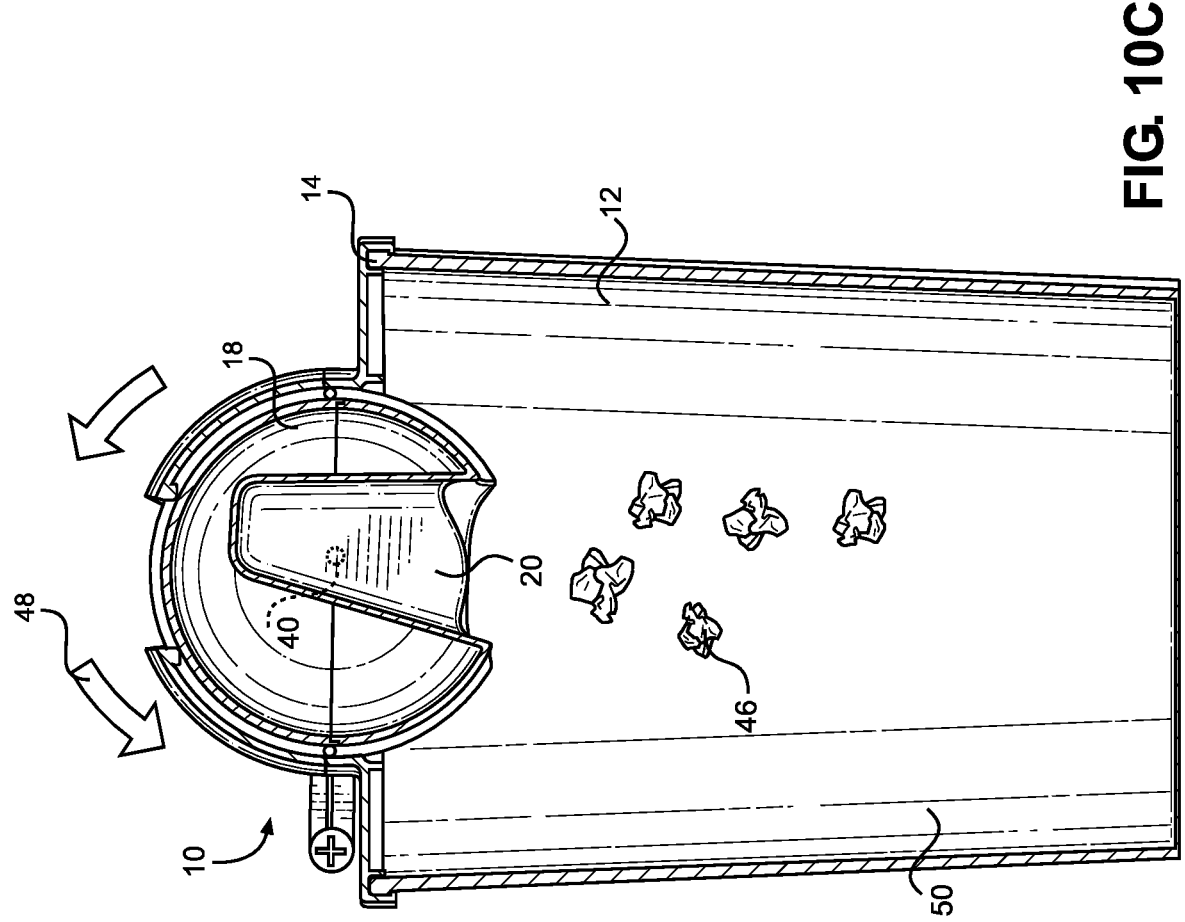

With reference now to FIGS. 10A-10C, a schematic illustration of the operation of the compost collection device 10 is illustrated. In FIG. 10A, waste materials 46 are placed in pocket 20 of the rotatable sphere 18. As the sphere 18 is rotated in the direction of the arrow 48 (FIG. 10B), the waste materials 46 are disposed toward an interior 50 of the waste collection bin 12. As shown in FIG. 10C, the waste materials 46 are disposed in the interior 50 of the collection bin 12 as the rotatable sphere 18 rotates from about 140 to about 180 degrees on the shaft stubs 40.

The collection bin 12, removable lid 14, rotatable sphere 18, and retaining lid 24 may be made of a wide variety of materials including resilient plastic materials and/or metals.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A compost collection device comprising:
    a waste collection bin; and
    a removable lid for the waste collection bin, the removable lid comprising:
        a first seal disposed between the removable lid and a top rim of the waste collection bin, the first seal for circumferentially sealing between the removable lid and the top rim of the waste collection bin;
        a circular opening in the removable lid;
        a rotatable sphere disposed in the circular opening in the removable lid, the rotatable sphere having a waste material pocket disposed therein;
        a second seal disposed between the rotatable sphere and the circular opening in the removable lid, the second seal for circumferentially sealing between the rotatable sphere and the circular opening in the removable lid;
        a handle attached to the rotatable sphere for rotating the rotatable sphere to deposit waste materials from the waste material pocket into the waste collection bin;
        a retaining lid having an opening therein for depositing waste materials into the waste material pocket in the rotatable sphere; and
        a third seal disposed between the retaining lid and the rotatable sphere adjacent the opening in the retaining lid, the third seal for circumferentially sealing between the rotatable sphere and the opening in the retaining lid.

2. The compost collection device of claim 1, further comprising a waste collection bag for insertion into the waste collection bin.

3. The compost collection device of claim 1, further comprising a cover for covering the waste collection bin when the removable lid is removed from the waste collection bin.

4. The compost collection device of claim 1, wherein the handle is between the retaining lid and the removable lid.

5. The compost collection device of claim 1, wherein the retaining lid is fixedly engaged with the removable lid with the rotatable sphere disposed between the removable lid and the retaining lid.

6. The compost collection device of claim 1, wherein the rotatable sphere is rotatable from a waste collection position to a waste deposit position through a rotation angle ranging from about 140 to about 180 degrees.

7. The compost collection device of claim 1, wherein the first seal, the second seal, and the third seal are comprised of resilient O-ring materials.

8. A method for collecting waste materials for a compost pile comprising the steps of:
    (i) providing a compost collection device that includes:
        a) a waste collection bin; and
        b) a removable lid for the waste collection bin, the removable lid comprising:
            (1) a first seal disposed between the removable lid and a top rim of the waste collection bin, the first seal for circumferentially sealing between the removable lid and the top rim of the waste collection bin;
            (2) a circular opening in the removable lid;
            (3) a rotatable sphere disposed in the circular opening in the removable lid, the rotatable sphere having a waste material pocket disposed therein;
            (4) a second seal disposed between the rotatable sphere and the circular opening in the removable lid, the second seal for circumferentially sealing between the rotatable sphere and the circular opening in the removable lid;

(5) a handle attached to the rotatable sphere for rotating the rotatable sphere to deposit waste materials from the waste material pocket into the waste collection bin;

(6) a retaining lid having an opening therein for depositing waste materials into the waste material pocket in the rotatable sphere; and (7) a third seal disposed between the retaining lid and the rotatable sphere adjacent the opening in the retaining lid, the third seal for circumferentially sealing between the rotatable sphere and the opening in the retaining lid;

(c) waste materials for deposit into the waste collection bin;

(ii) inserting waste materials into the waste material pocket in the rotatable sphere;

(iii) rotating the rotatable sphere from a waste collection position through an angle ranging from about 140 to about 180 degrees to a waste deposit position, whereby substantially all of the waste materials in the waste material pocket of the rotatable sphere fall into the waste collection bin; and (iv) rotating the rotatable sphere back to the waste deposit position to seal the waste collection bin from odor release to the atmosphere.

9. The method of claim 8, wherein the compost collection device includes a waste collection bag, further comprising inserting the waste collection bag into the waste collection bin before step (ii).

10. The method of claim 8, further comprising repeating steps (ii)-(iv) until the waste collection bin is full.

11. The method of claim 10, further comprising (v) removing removable lid from the collection bin and covering the waste collection bin with a cover.

12. The method of claim 9, further comprising repeating steps (ii)-(iv) until the waste collection bag is full.

13. The method of claim 12, further comprising (v) removing the waste collection bag from the waste collection bin.

14. A compost collection device comprising:
a waste collection bin; and
a removable lid for the waste collection bin, the removable lid comprising:
a circular opening in the removable lid;
a vertical lip positioned around the circular opening, the vertical lip having at least two vertical lip grooves;
a retaining lid positioned over the circular opening, the retaining lid having a dome-like spherical shell structure and at least two retaining lid grooves, each retaining lid groove corresponding to a vertical lip groove to form a shaft stub tunnel;
a rotatable sphere disposed at least partially in the retaining lid and in the circular opening in the removable lid, the rotatable sphere having a waste material pocket disposed therein;
a first seal disposed between the rotatable sphere and the circular opening in the removable lid, the first seal for circumferentially sealing between the rotatable sphere and the circular opening in the removable lid;
the retaining lid having an opening therein for depositing waste materials into the waste material pocket in the rotatable sphere;
a first shaft stub and a second shaft stub positioned on opposite sides of the rotatable sphere, each shaft stub positioned through a shaft stub tunnel;
a handle attached to the rotatable sphere by the first shaft stub and the second shaft stub through a retaining lid groove and a vertical lip groove for rotating the rotatable sphere to deposit waste materials from the waste material pocket into the waste collection bin; and
a second seal disposed between the retaining lid and the rotatable sphere adjacent the opening in the retaining lid, the second seal for circumferentially sealing between the rotatable sphere and the opening in the retaining lid.

15. The compost collection device of claim 14, wherein the handle is between the retaining lid and the removable lid.

16. The compost collection device of claim 14, wherein the retaining lid is fixedly engaged with the removable lid with the rotatable sphere disposed between the removable lid and the retaining lid.

17. The compost collection device of claim 14, wherein the rotatable sphere is rotatable from a waste collection position to a waste deposit position through a rotation angle ranging from about 140 to about 180 degrees.

18. The compost collection device of claim 14, wherein a grabbable portion of the handle orbitally rotates around an axis between the first shaft stub and the second shaft stub.

19. The compost collection device of claim 18, wherein the grabbable portion of the handle is positioned external of the retaining lid and parallel to an axis between the shaft stubs.

20. The compost collection device of claim 14, wherein the first seal and the second seal are comprised of resilient O-ring materials.

* * * * *